United States Patent [19]

Hostetler et al.

[11] Patent Number: 4,853,462

[45] Date of Patent: Aug. 1, 1989

[54] PREPARATION OF DISCRETE PARTICLES OF POLYALKYLENE CARBONATE

[75] Inventors: Donald E. Hostetler, West Chester; Michael J. Cannarsa, Lafayette Hill; Haven S. Kesling, Jr., Drexel Hill, all of Pa.; Hsiang-Ning Sun, Houston, Tex.

[73] Assignee: Arco Chemical Technology, Inc., Wilmington, Del.

[21] Appl. No.: 171,334

[22] Filed: Mar. 21, 1988

[51] Int. Cl.[4] .................................................. C08J 3/14
[52] U.S. Cl. .................................... 528/494; 528/370; 528/493; 528/495; 528/499; 528/503
[58] Field of Search ............... 528/493, 499, 503, 370, 528/491, 492, 496, 497, 494; 525/461

[56] References Cited

U.S. PATENT DOCUMENTS 2,964,516 12/1960 Henderson ........................... 528/503

Primary Examiner—Theodore E. Pertilla
Attorney, Agent, or Firm—Lewis J. Young

[57] ABSTRACT

The selection of the proper solvent systems for polyalkylene carbonates which completely dissolve the polymer at high temperatures but are non-solvents at lower temperatures allows one to obtain discrete particles of the polymers suitable for many applications, processing and handling. The particles size can be controlled from about 30 to about 3000 microns in diameter.

13 Claims, No Drawings

PREPARATION OF DISCRETE PARTICLES OF POLYALKYLENE CARBONATE

BACKGROUND OF THE INVENTION

The present invention is directed to a process for making discrete shaped particles of copolymers of epoxides with carbon dioxide.

Polymers are known to be processed into many different physical forms, such as particles, extrudates, sheets, pellets, and beads for different requirements in handling, processing, and other applications. Although a number of polymers are obtained in specific physical forms directly from the polymerization process, others have to be processed to attain the desirable shape and form.

Polyalkylene carbonates are obtained generally in the form of slabs after purification/isolation. Although this can be ground into an acceptable form for many applications, it is desirable to convert it into other physical shapes for easy processing, and handling in certain specific applications. Thus, for foam molding, spherically shaped particles are preferred.

BRIEF SUMMARY OF THE INVENTION

It has now been found that discrete rounded particles of polyalkylene carbonates can be formed by controlled precipitation of a solution of the polymer by controlled cooling of the solution. The particle size can be controlled from about 30 to 3000 microns. The solvent of choice will be a poor solvent at ambient temperatures but dissolve the polymer at an elevated temperature.

DETAILED DESCRIPTION OF THE INVENTION

The present invention relates to a method for producing discrete particles of a polyalkylene carbonate comprising:

(a) adding the polycarbonate to a suitable solvent;

(b) heating the mixture of polymer and solvent until the polymer dissolves;

(c) cooling the solution at a controlled rate until the temperature is reached at which the polymer precipitates in the form of discrete particles in a desired particle size of between 30 and 3000 microns; and (d) separating the precipitated polymer particles, washing and drying them.

It is, of course, convenient to recycle the solvent to remove any polyalkylene carbonate oligomers and to minimize solvent cost.

The polyalkylene carbonates are first dissolved in certain solvents which have unique temperature dependent solvencies such that at some relatively high temperature the polymer is completely soluble, but at some lower temperature, the polymer becomes insoluble and precipitates out of the solution. The particle size and particle size distribution are controlled by varying the solvent, concentration, rate of cooling the solution, agitation rate and other processing conditions. Mixtures of two or more solvents having different precipitation temperatures with the polyalkylene carbonates can be used to adjust the particle size also.

Suitable solvents for the present invention are chosen from ethers, esters, aromatics, lactones, lactams, halogenated fragments, ketones, and amides. Thus, the preferred solvents for the invention may be the glycol ethers, glycol esters and hydroxy ketones. Also suitable may be the aliphatic alcohols containing aromatic groups. Each individual polymer must be investigated to arrive at the particular solvent, concentration of polymer in that solvent, and the temperatures useful to prepare the desired particle size.

The temperature of precipitation is defined by the polyalkylene carbonate and the solvent.

The cooling rate of the solution to precipitate the polymer depends on the polymer concentration, choice of solvent, desired particle size, agitation speed, and the polymer structure. The rate of cooling may be in the range of 0.001° C./minute to 1000° C./minute, with a preferred range of from 0.1° C./minute to 10° C./minute. The cooling rate is tailored to each system and may be variable within each system.

Polymer concentration can be varied depending on the polymer structure, the choice of solvent, high temperature, low temperature, and the desired particle size. Commercially, it is desirable to use the highest concentration feasible to obtain the desired properties. Generally, concentrations of between about 5 and 20 wt-% are useful.

Agitation rates are of great importance. They are in the broad range from 10 rpm to 5000 rpm. The preferred range is between about 500 and about 2000 rpm.

The polymer may be prepared by reacting a mixture of cyclopentene oxide, cyclohexene oxide, cycloheptene oxide, or isobutylene oxide in a solvent such as methylene chloride or hexane under a pressure of 100 to 700 psig of carbon dioxide using a zinc carboxylate catalyst for up to 40 hours at 25° to 110° C. in accordance with the polymerizations described in either Soga et al, Polymer J. 16, 407 (1981) or Inoue, Makromol. Chem., Rapid Commun. 1, 775 (1980), both of which are hereby incorporated in their entirety herein. Thus, Soga et al teach copolymerization of propylene oxide and carbon dioxide by heating at 60° C. for 40 hours using zinc carboxylate catalysts supported on such materials as silicon dioxide, magnesium oxide and aluminum oxide. Inoue used catalysts prepared by the reaction of zinc oxide with aromatic dicarboxylic acids to polymerize propylene oxide in carbon dioxide at 35° C. for 40 hours. Other catalysts useful for the preparation of the polymers are the zinc dialkyls and the aluminum porphyrins.

The polymers may also have various other additives such as surfactants, pigments, stabilizers, flame retardants, antistatic agents, and flow agents so long as they do not interfere with the desired properties of the product.

The following examples are meant to further illustrate, but not limit, the invention. All parts and percentages are by weight unless otherwise designated.

EXAMPLE I

To a five gallon stainless steel reactor were added 1373 g of cyclohexene oxide, 369 g of propylene oxide, 4971 g of methylene chloride, and carbon dioxide and the mixture was polymerized by the method of Soga et al. Following precipitation and drying of the product, 1506 g of the desired polymer were obtained. Nuclear magnetic resonance (NMR), and infrared spectroscopies showed that the product was at least 99% pure as the desired terpolymer between the two epoxides and carbon dioxide. The molar ratio between the epoxides and carbon dioxide was 1:1. The molar ratio of cyclohexene oxide to propylene oxide was 70:30.

EXAMPLE II

To a 500 ml stainless steel autoclave were added 30 g of propylene oxide, 90 g of hexane, and carbon dioxide and the mixture was polymerized according to the method of Inoue. The product was precipitated by the addition of methanol. After drying, 24.9 g of polymer were obtained. The polymer was at least 99% pure polypropylene carbonate as determined by NMR and infrared spectroscopies.

Replacement of the propylene oxide with cyclohexene oxide, cyclopentene oxide, and cis-2-butene oxide respectively, gave the appropriate polyalkylene carbonate.

EXAMPLE III

To illustrate the preparation of discrete polymer particles according to the present invention, a 10 wt-% solution of the polypropylene carbonate/cyclohexene carbonate prepared in Example I was prepared by adding 10 g of the polymer to 90 g of propylene glycol acetate. This slurry was heated with agitation at a rate of 3° C./minute to nearly boiling until all the polymer dissolved. This solution was allowed to cool at a rate of 1° C./minute with vigorous stirring. Fine, discrete polymer particles were recovered at room temperature after filtration. The solids were washed with water several times, followed by drying at 45° C. in vaccuo to give 9.4 g of free-flowing polymer particles with a size in the range between 160 and 600 microns.

EXAMPLE IV

A 5 wt-% solution of the 30/70 polypropylene carbonate/cyclohexene carbonate was prepared by adding 10 g of the polymer obtained from Example I to 190 g of propylene glycol t-butyl ether. The slurry was heated at the rate of 3° C./min with vigorous agitation to 110° C. The temperature was maintained at 110° C. until all the polymer had dissolved. This solution was agitated at this temperature for another hour and was then allowed to cool to 24° C. at a rate of 0.5° C./minute. Fine discrete polymer particles were recovered with filtration followed by washing with copious quantities of hexanes. The solids were dried at 45° C. in vacuo for 16 hours to give 9.6 g of homogeneously shaped particles with 81% by weight in the 250–600 micron range.

Similar results were obtained using tripropylene glycol methyl ether instead of the propylene glycol t-butyl ether as solvent.

EXAMPLE V

A 20 wt-% solution of the reaction mixture containing 6.0 g of polycyclohexene carbonate prepared in accordance with the procedure of Example II was filtered to remove the zinc carboxylate catalyst. This was added to 94 g of propylene glycol t-butyl ether and the methylene chloride polymerization solvent was stripped. The slurry was heated to 130° C. at a rate of 2° C./minute with vigorous agitation. The temperature of the solution was maintained at 130° C. until all the polymer had dissolved. In some cases, if high molecular weight insoluble polymer is present, it is removed by filtration of the hot solution. This solution was allowed to cool to 2520 C. at a rate of 0.8° C./minute to give discrete polymer particles. The particles were filtered and washed with copious amounts of water followed by drying at 70° C. in vacuo to give 5.1 g of particles having 76 wt-% in the 250 to 600 microns diameter size rang..

EXAMPLE VI

Example IV was repeated except that the polymer solution concentration was 9.5 wt-%. After work up, 68% of the polymer particles were larger than 600 microns, and 30.5 wt-% were in the 250 to 600 micron range as determined by sieving and optical microscopic measurements.

EXAMPLE VII

A 5 wt-% solution of 30/70 polypropylene carbonate/cyclohexene carbonate was prepared by adding 5 g of the polymer from Example I to 95 g of propylene glycol t-butyl ether. The slurry was heated at a rate of 0.3° C./minute to 115° C., and the temperature was maintained until all the polymer had dissolved. Then, 0.1 g of tricalcium phosphate was added, and the mixture was agitated at 115° C. for another 30 minutes. The mixture was then allowed to cool to 24° C. at a rate of 0.6° C./minute with vigorous agitation. The discrete particles were then filtered and washed with copious amounts of water. The wet polymer particles were then dried at 45° C. in vaccuo for 16 hours to give 4.7 g of free flowing particles having 85 wt-% in the 250 to 600 micron diameter size and 9 wt-% in the 105 to 150 micron diameter size.

EXAMPLE VIII

Example VII was repeated with a 15 wt-% solution at 132° C. The product had the following particle size distribution:

| | |
|---|---|
| 250–600 u | 6.6 wt-% |
| 105–250 u | 84.5 wt-% |
| <105 u | 1.2 wt-% |

EXAMPLE IX

A 20 g sample of the beads produced in Example VII having a particle size of 250–600 micron were added to 100 ml of water containing 3 g of tricalcium phosphate (TCP) and 0.06 g of sodium dodecylbenzene sulfonate. The aqueous particle suspension was then placed in a 130 ml Fisher-Porter pressure bottle containing a magnetic stir bar. The bottle was then sealed and placed in a thermostated oil bath and heated to 135° C. for 5 hours with rapid agitation. The oil bath and bottle were then cooled with continued stirring. Finally the bottle was removed from the bath and the particles were isolated by filtration and washed with 0.1N HCl to remove residual TCP.

The bulk density of the particles increased from 0.40 g/cc to 0.65 g/cc. Microscopic examination at 20x magnification showed that the particles had a smooth solid surface. The particles were semi-spherical.

EXAMPLE X

A 20 wt-% solution of 30/70 polypropylene carbonate/cyclohexene carbonate was prepared by dissolving 200 g of the polymer obtained from Example I in 800 g of ethylene glycol-tert-butyl ether at a solvent temperature between 110° and 120° C. The temperature was maintained at that temperature for one hour or until all of the polymer was dissolved. The solution was then allowed to cool to room temperature at a controlled rate of 0.5° C./minute with vigorous agitation. Fine discrete polymer particles were recovered by filtration. The powder was then washed with copious amounts of water. The wet particles were then dried for 24 hours in vacuo to give 196 g of free flowing particles having 90 wt-% in the 250–850 micron diameter size and 5 wt-% in the 105–150 micron diameter size.

We claim:

1. A method for producing discrete particles of a polyalkylene carbonate comprising:
   (a) combining the polyalkylene carbonate and a polar solvent to form a mixture;
   (b) heating the mixture to form a solution;
   (c) cooling and agitating the solution at a controlled rate of cooling until a temperature is reached at which the polyalkylene carbonate precipitates in the form of discrete particles having a desired particle size of between 30 and 3000 microns; and
   (d) separating the precipitated discrete particles from the polar solvent.

2. The method of claim 1 comprising a further step after step (d) of heating the discrete particles in an aqueous slurry to further round off the particles and increase their bulk density.

3. The method of claim 1 wherein the polar solvent is selected from the group consisting of glycol ethers, glycol esters, aromatic alcohols, and hydroxy ketones.

4. The method of claim 1 wherein the polyalkylene carbonate is polypropylene carbonate and the polar solvent is propylene glycol t-butyl ether.

5. The method of claim 1 wherein the polyalkylene carbonate is polypropylene carbonate/cyclohexene carbonate terpolymer and the polar solvent is propylene glycol acetate.

6. Discrete particles of polyalkylene carbonate formed by the method of claim 1

7. The method of claim 1 wherein the polar solvent is selected from the group consisting of ethylene glycol t-butyl ether, propylene glycol t-butyl ether, propylene glycol acetate, and tripropylene glycol methyl ether.

8. The method of claim 1 wherein the polyalkylene carbonate is selected from the group consisting of polypropylene carbonate, polycyclohexene carbonate, poly(isobutylene) carbonate, polycyclopentene carbonate, poly(cis-2-butene) carbonate, and polypropylene carbonate/cyclohexene carbonate.

9. The method of claim 1 comprising the additional step after step (d) of washing the separated discrete particles.

10. The method of claim 1 comprising the additional step after step (d) of drying the separated discrete particles.

11. A method for producing discrete particles of a polyalkylene carbonate selected from the group consisting of polypropylene carbonate, polycyclohexene carbonate, poly(isobutylene) carbonate, polycyclopentene carbonate, and polypropylene carbonate/cyclohexene carbonate comprising:
    (a) combining the polyalkylene carbonate and a solvent selected from the group consisting of ethylene glycol t-butyl ether, propylene glycol t-butyl ether, propylene glycol acetate, and tripropylene glycol methyl ether to form a mixture;
    (b) heating the mixture until a solution is formed;
    (c) cooling and agitating the solution at a cooling rate of between about 0.1° C./minute to 10° C./minute until a temperature is reached at which the polyalkylene carbonate precipitates in the form of discrete particles having a desired particle size of between 30 and 3000 microns;
    (d) separating the precipitated discrete particles from the solvent;
    (e) washing the separated discrete particles; and
    (f) drying the washed discrete particles.

12. The method of claim 11 comprising a further step after step (d), (e), or (f) of heating the discrete particles in an aqueous slurry to further round off the particles and increase their bulk density.

13. Discrete particles of polyalkylene carbonate formed by the method of claim 11.

* * * * *